US00RE48101E

(19) United States
(12) Reissued Patent
Seo et al.

(10) Patent Number: US RE48,101 E
(45) Date of Reissued Patent: Jul. 14, 2020

(54) METHOD OF TRANSMITTING DOWNLINK CHANNEL RANK INFORMATION THROUGH PHYSICAL UPLINK SHARED CHANNEL

(71) Applicant: Electronics and Telecommunications Research Institute, Daejeon (KR)

(72) Inventors: Bangwon Seo, Daejeon (KR); Young Jo Ko, Daejeon (KR)

(73) Assignee: Electronics and Telecommunications Research Institute, Daejeon-si (KR)

(21) Appl. No.: 14/958,500

(22) Filed: Dec. 3, 2015

Related U.S. Patent Documents

Reissue of:
(64) Patent No.: 8,599,781
Issued: Dec. 3, 2013
Appl. No.: 13/105,428
Filed: May 11, 2011

(30) Foreign Application Priority Data

May 11, 2010 (KR) ..... 2010-0043844

(51) Int. Cl.

| | |
|---|---|
| ***H04W 4/00*** | (2018.01) |
| ***H04B 7/02*** | (2018.01) |
| ***H04L 27/00*** | (2006.01) |
| ***H04L 1/00*** | (2006.01) |
| ***H04B 7/06*** | (2006.01) |
| ***H04L 1/08*** | (2006.01) |
| ***H04L 5/00*** | (2006.01) |

(52) U.S. Cl.
CPC ..... *H04L 1/0072* (2013.01); *H04B 7/063* (2013.01); *H04L 1/0041* (2013.01); *H04L 1/0057* (2013.01); *H04L 1/08* (2013.01); *H04L 5/0057* (2013.01); *H04L 1/0026* (2013.01)

(58) Field of Classification Search
CPC ..... H04L 1/0072; H04L 5/0057; H04L 1/08; H04L 1/0057; H04L 1/0041; H04L 1/0026; H04B 7/063
See application file for complete search history.

(56) References Cited

U.S. PATENT DOCUMENTS 8,477,868 B2 * 7/2013 Han ..... H04B 7/068 375/259
8,588,162 B2 * 11/2013 Jang ..... H04L 1/0042 370/329
8,599,781 B2 * 12/2013 Seo ..... H04B 7/063 370/329

(Continued)

*Primary Examiner* — David E England

(57) ABSTRACT

Provided is a method of transmitting channel rank information (RI) when the number of bits for transmitting the channel RI to be transmitted through a physical uplink shared channel (PUSCH) is three or more. The method includes mapping channel RI to be transmitted to a channel RI bit string of 3 bits or more, Reed-Muller coding and rate-matching the channel RI bit string using a basis sequence having a 32-bit code length, and generating modulation symbols by applying the bit sequence that has been Reed-Muller coded and rate-matched to a modulation mapper. Accordingly, the method of transmitting downlink channel RI can be employed when five or more antennas are used for downlink transmission or several carrier bands are used by carrier aggregation as specified in Third Generation Partnership Project (3GPP) long term evolution (LTE)-advanced following 3GPP LTE release 10.

8 Claims, 3 Drawing Sheets

(56) References Cited

U.S. PATENT DOCUMENTS

| | | | | |
|---|---|---|---|---|
| 8,724,564 | B2 * | 5/2014 | Kim | H04B 7/0639 370/329 |
| 8,848,557 | B2 * | 9/2014 | Nam | H04L 1/1671 370/241 |
| 9,113,458 | B2 * | 8/2015 | Lee | H04W 52/04 |
| 9,113,459 | B2 * | 8/2015 | Jang | H04L 1/0042 |
| 9,160,486 | B2 * | 10/2015 | Ko | H04B 7/0413 |
| 9,391,736 | B2 * | 7/2016 | Nayeb Nazar | H04L 1/0027 |
| 9,722,755 | B2 * | 8/2017 | Jang | H04L 1/0042 |
| 10,123,343 | B2 * | 11/2018 | Nazar | H04L 1/0027 |
| 2009/0238298 | A1 * | 9/2009 | Kim et al. | 375/267 |
| 2009/0245170 | A1 | 10/2009 | Zhang et al. | |
| 2009/0296850 | A1 | 12/2009 | Xu et al. | |
| 2011/0249578 | A1 * | 10/2011 | Nayeb Nazar | H04L 1/0027 370/252 |
| 2012/0044884 | A1 * | 2/2012 | Jang | H04L 1/0042 370/329 |
| 2012/0044885 | A1 * | 2/2012 | Jang | H04L 1/0042 370/329 |
| 2012/0044886 | A1 * | 2/2012 | Jang | H04L 1/0042 370/329 |
| 2012/0320880 | A1 * | 12/2012 | Han | H04L 5/001 370/335 |
| 2013/0039398 | A1 * | 2/2013 | Ko | H04L 1/08 375/219 |
| 2013/0163521 | A1 * | 6/2013 | Lee | H04L 5/0007 370/328 |
| 2014/0016546 | A1 * | 1/2014 | Jang | H04L 1/0073 370/328 |

* cited by examiner

| $o_0^{RI}$, $o_1^{RI}$, $o_2^{RI}$ | RI |
|---|---|
| 0, 0, 0 | 1 |
| 0, 0, 1 | 2 |
| 0, 1, 0 | 3 |
| 0, 1, 1 | 4 |
| 1, 0, 0 | 5 |
| 1, 0, 1 | 6 |
| 1, 1, 0 | 7 |
| 1, 1, 1 | 8 |

FIG. 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

METHOD OF TRANSMITTING DOWNLINK CHANNEL RANK INFORMATION THROUGH PHYSICAL UPLINK SHARED CHANNEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM FOR PRIORITY

This application *is a reissue of U.S. patent application Ser. No. 13/105,428, filed on May 11, 2011, now U.S. Pat. No. 8,599,781 B2 issued on Dec. 3, 2013, which* claims priority to*, and the benefit of,* Korean Patent Application No. 2010-0043844 filed on May 11, 2010 in the Korean Intellectual Property Office (KIPO), the entire contents of which are hereby incorporated by reference.

BACKGROUND

1. Technical Field

Example embodiments of the present invention relate in general to a method of transmitting channel rank information (RI) through a physical uplink shared channel (PUSCH) in a Third Generation Partnership Project (3GPP) long term evolution (LTE) and LTE-advanced system, and more specifically, to a method of transmitting channel RI when the number of bits for transmitting the channel RI to be transmitted through a PUSCH is three.

2. Related Art

In 3GPP TS 36.211 v9.0.0 and 3GPP TS 36.212 v9.0.0 of 3GPP LTE release 8/9, a maximum of four transmitter antennas are used for downlink multiple-input multiple-output (MIMO) data transmission.

Assuming that there are two transmitter antennas, a terminal determines a value of {1, 2} as RI of a downlink channel matrix and feeds the 1-bit RI back to a base station. Also, assuming that there are four transmitter antennas, a terminal determines a value of {1, 2, 3, 4} as RI of a downlink channel matrix and feeds the 2-bit RI back to a base station. In 3GPP TS 36.212 v9.0.0, a standard has been only defined for a method of encoding and transmitting RI when the RI is one bit (i.e., a case where there are two downlink antennas) or two bits (i.e., a case where there are four downlink antennas).

However, in 3GPP LTE-advanced following 3GPP LTE release 10 that is a standard after 3GPP LTE release 8/9, a maximum of eight transmitter antennas are used for downlink MIMO data transmission. In following standards, the number of transmitter antennas may further increase to improve a data transmission rate.

For example, when there are eight transmitter antennas, a terminal should determine a value of {1, 2, 3, 4, 5, 6, 7, 8} as RI of a downlink channel matrix and feed the 3-bit RI back to a base station.

Furthermore, in standards following 3GPP LTE release 8/9, it has been determined to use carrier aggregation whereby successive or non-successive carrier bands are aggregated and used. In this case, channel RI about several carrier bands should be fed back from a terminal to a base station, and thus the number of bits of channel RI that should be transmitted may further increase.

Meanwhile, in a 3GPP LTE system and LTE-advanced system, terminals transmit control information to a base station through a PUSCH or physical uplink control channel (PUCCH), and channel RI is encoded by repetition coding and transmitted through the PUSCH.

However, as described above, a case in which the number of bits for transmitting channel RI is three or more is not taken into consideration at all in current 3GPP LTE release 8/9. Consequently, a method of encoding and transmitting channel RI when the number of bits of channel RI is three or more is necessary for 3GPP LTE release 10 or the following standards.

SUMMARY

Accordingly, example embodiments of the present invention are provided to substantially obviate one or more problems due to limitations and disadvantages of the related art.

Example embodiments of the present invention provide a method of transmitting channel rank information (RI) when there are five or more downlink transmitter antennas or three or more channel RI bits are required to transmit downlink channel RI by carrier aggregation in a method of transmitting downlink channel information through a physical uplink shared channel (PUSCH) in a Third Generation Partnership Project (3GPP) long term evolution (LTE) or LTE-advanced system.

In some example embodiments, a method of transmitting channel RI when the number of bits for transmitting the channel RI to be transmitted through a PUSCH is three includes: mapping the channel RI (one value of {1, 2, 3, 4, 5, 6, 7, 8}) to be transmitted to a 3-bit channel RI bit string $[O_0^{RI}O_1^{RI}O_2^{RI}]$ and repeatedly mapping the 3-bit channel RI bit string to modulation symbols in sequence according to a modulation order.

Here, mapping the channel RI may include mapping the channel RI (one value of {1, 2, 3, 4, 5, 6, 7, 8}) to the 3-bit channel RI bit string $[O_0^{RI}O_1^{RI}O_2^{RI}]$ according to the table depicted in FIG. 2 herein.

Here, repeatedly mapping the 3-bit channel RI bit string may include repeatedly mapping the 3-bit channel RI bit string to modulation symbols in the form of $[O_0^{RI}O_1^{RI}O_2^{RI}O_0^{RI}O_1^{RI}O_2^{RI}]$ when the modulation symbols are quadrature phase-shift keying (QPSK) symbols.

Here, repeatedly mapping the 3-bit channel RI bit string may include repeatedly modulating and mapping the 3-bit channel RI bit string in the form of $[O_0^{RI}O_1^{RI}\mathrm{xx}O_2^{RI}O_0^{RI}\mathrm{xx}O_1^{RI}O_3^{RI}\mathrm{xx}]$ when the modulation symbols are 16-quadrature amplitude modulation (QAM) symbols, and "x" may be a placeholder maximizing a Euclidean distance between the modulation symbols.

Here, repeatedly mapping the 3-bit channel RI bit string may include repeatedly modulating and mapping the 3-bit channel RI bit string in the form of $[O_0^{RI}O_1^{RI}\mathrm{xxxx}O_2^{RI}O_0^{RI}\mathrm{xxxx}O_1^{RI}O_2^{RI}\mathrm{xxxx}]$ when the modulation symbols are 64-QAM symbols, and "x" may be a placeholder maximizing a Euclidean distance between the modulation symbols.

In other example embodiments, a method of transmitting channel RI when the number of bits for transmitting the channel RI to be transmitted through a PUSCH is three or more includes: mapping the channel RI to be transmitted to a channel RI bit string of 3 bits or more; Reed-Muller coding the channel RI bit string using a basis sequence having a 32-bit code length; and generating modulation symbols by applying the Reed-Muller coded bit sequence to a modulation mapper.

Here, the Reed-Muller coding may be performed by the following expression:

$$q_i^{RI} = \sum_{n=0}^{N^{RI}-1} (O_n^{RI} \cdot M_{(i \bmod 32),n}) \bmod 2 \quad (i = 0, 1, \ldots, Q_{RI} - 1)$$

where $q_i^{RI}$ denotes a bit sequence obtained after encoding, $Q_{RI}$ denotes the number of bits after encoding, and $M_{i,n}$ denotes a basis sequence having a value of 0 or 1.

BRIEF DESCRIPTION OF DRAWINGS

Example embodiments of the present invention will become more apparent by describing in detail example embodiments of the present invention with reference to the accompanying drawings, in which:

FIG. 4 is a table showing an example of a basis sequence that can be applied to Reed-Muller coding of channel RI in the method of transmitting channel RI according to the second example embodiment of the present invention.

DESCRIPTION OF EXAMPLE EMBODIMENTS OF THE PRESENT INVENTION

Figures 1, 2:
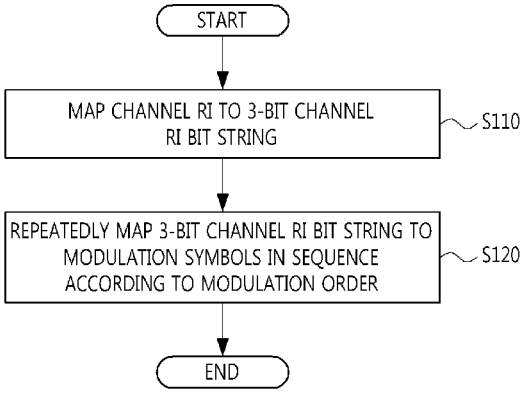
FIG. 1 is a flowchart illustrating a method of transmitting channel rank information (RI) according to a first example embodiment of the present invention.
FIG. 2 is a table showing an example of mapping between RI of a downlink channel matrix and channel RI bit strings.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "terminal" used herein may refer to a mobile station (MS), user equipment (UE), user terminal (UT), wireless terminal, access terminal (AT), subscriber unit, subscriber station (SS), wireless device, wireless communication device, wireless transmit/receive unit (WTRU), moving node, mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" used herein generally denotes a fixed or moving point communicating with a terminal, and may refer to a Node-B, evolved Node-B (eNB), base transceiver system (BTS), access point, relay, femto-cell, and other terms.

Hereinafter, two example embodiments of a method of transmitting channel rank information (RI) according to the present invention will be described. A first example embodiment is obtained by expanding repetition coding used to encode RI according to conventional Third Generation Partnership Project (3GPP) long term evolution (LTE) release 8/9, and can be employed when the length of a channel RI bit string required to transmit channel RI is 3 bits. A second example embodiment makes use of block coding, that is, Reed-Muller coding, and can be employed when the length of a channel RI bit string required to transmit channel RI is 3 bits or more.

First Example Embodiment

The first example embodiment corresponds to a method of transmitting channel RI when the number of bits for transmitting the channel RI through a physical uplink shared channel (PUSCH) is three. When the number of bits for transmitting the channel RI is three, the number of downlink transmitter antennas may be five to eight.

FIG. 1 is a flowchart illustrating a method of transmitting channel RI according to the first example embodiment of the present invention.

Referring to FIG. 1, a method of transmitting channel RI according to the first example embodiment of the present invention may include mapping channel RI (one value of {1, 2, 3, 4, 5, 6, 7, 8}) to be transmitted to a 3-bit channel RI bit string $[O_0^{RI}O_1^{RI}O_2^{RI}]$ (S110), and repeatedly mapping the 3-bit channel RI bit string to modulation symbols in sequence according to a modulation order (S120).

First, in the mapping step (S110), the channel RI to be transmitted is mapped to a 3-bit channel RI bit string $[O_0^{RI}O_1^{RI}O_2^{RI}]$.

Here, $O_0^{RI}$ denotes the most significant bit (MSB) of $N^{RI}$-bit input information, and $O_2^{RI}$ denotes the least significant bit (LSB) of the $N^{RI}$-bit input information.

When RI is 3 bits, that is, the RI is $[O_0^{RI}O_1^{RI}O_2^{RI}]$, the 3-bit RI $[O_0^{RI}O_1^{RI}O_2^{RI}]$ may be determined according to a mapping relation illustrated in FIG. 2 between values of {1, 2, 3, 4, 5, 6, 7, 8} that the RI of a downlink channel matrix can have and channel RI bit strings. FIG. 2 is a table showing an example of mapping between RI of a downlink channel matrix and channel RI bit strings.

Next, in the repeated mapping step (S120), the 3-bit channel RI bit string is repeatedly mapped to modulation symbols in sequence according to a modulation order as will be described below.

First, when the 3-bit channel RI bit string is mapped to a quadrature phase-shift keying (QPSK) symbol, the channel RI bits may be mapped as shown in Expression 1 below.

$$[O_0^{RI}O_1^{RI}O_2^{RI}O_0^{RI}O_1^{RI}O_2^{RI}] \quad \text{[Expression 1]}$$

In other words, in the case of a QPSK symbol, two pieces of bit information can be transmitted per modulation symbol, and the three channel RI bits may be repeatedly coded two times per three symbols as shown in Expression 1.

Second, when the 3-bit channel RI bit string is mapped to a 16-quadrature amplitude modulation (QAM) symbol, the channel RI bits may be mapped as shown in Expression 2 below.

$$[O_0^{RI}O_1^{RI}\text{xx}O_2^{RI}O_0^{RI}\text{xx}O_1^{RI}O_2^{RI}\text{xx}] \quad \text{[Expression 2]}$$

In other words, in the case of a 16-QAM symbol, four pieces of bit information can be transmitted per modulation symbol, and the three channel RI bits may be repeatedly coded two times per three symbols as shown in Expression 2. Here, "x" denotes a placeholder, which is a value selected to maximize a Euclidean distance between 16-QAM modulation symbols including channel RI.

Third, when the 3-bit channel RI bit string is mapped to a 64-QAM symbol, the channel RI bits may be mapped as shown in Expression 3 below.

$$[O_0^{RI}O_1^{RI}\text{xxxx}O_2^{RI}O_0^{RI}\text{xxxx}O_1^{RI}O_2^{RI}\text{xxxx}] \quad \text{[Expression 3]}$$

In other words, in the case of a 64-QAM symbol, six pieces of bit information can be transmitted per modulation symbol, and the three channel RI bits may be repeatedly coded two times per three symbols as shown in Expression 3. Here, "x" denotes a placeholder, which is a value selected to maximize a Euclidean distance between 64-QAM modulation symbols including channel RI.

Second Example Embodiment

The second example embodiment corresponds to a method of transmitting channel RI when the number of bits for transmitting the channel RI through a PUSCH is three or more. When the number of bits for transmitting the channel RI is three or more, the number of downlink transmitter antennas may be five or more, or the number of carrier bands in which the channel RI needs to be transmitted by carrier aggregation is two or more.

Figure 3:
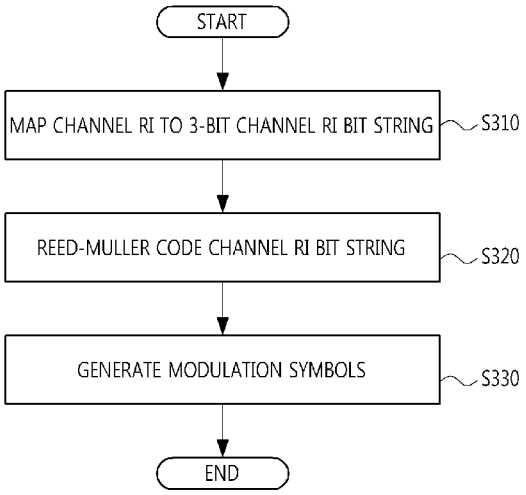
FIG. 3 is a flowchart illustrating a method of transmitting channel RI according to a second example embodiment of the present invention.

FIG. 3 is a flowchart illustrating a method of transmitting channel RI according to the second example embodiment of the present invention.

Referring to FIG. 3, a method of transmitting channel RI according to the second example embodiment of the present invention may include mapping channel RI to be transmitted to a channel RI bit string of 3 bits or more (S310), Reed-Muller coding the channel RI bit string using a basis sequence having a 32-bit code length (S320), and generating modulation symbols by applying the Reed-Muller coded bit sequence to a modulation mapper (S330).

First, in the mapping step (S310), channel RI to be transmitted is mapped to a channel RI bit string $[O_0^{RI}, O_1^{RI}, \ldots, O_{N^{RI}-1}^{RI}]$ of 3 bits or more.

Here, $N^{RI}$ denotes the number of bits required to transmit channel RI ($N^{RI} \geq 3$ in the second example embodiment), $O_0^{RI}$ denotes the MSB of $N^{RI}$-bit input information, and $O_{N^{RI}-1}^{RI}$ denotes the LSB of the $N^{RI}$-bit input information.

For example, when the number of bits for transmitting channel RI is three (i.e., $N^{RI}=3$), a 3-bit channel RI bit string $[O_0^{RI}O_1^{RI}O_2^{RI}]$ may be determined according to the mapping relation illustrated in FIG. 2 between values of {1, 2, 3, 4, 5, 6, 7, 8} that the RI of a downlink channel matrix can have and channel RI bit strings. In other words, this case is the same as the mapping relation exemplified in the first example embodiment. Also, when the number of bits for transmitting channel RI is four or more, a channel RI bit string may be mapped in a similar way as illustrated in FIG. 2.

Next, the Reed-Muller coding step (S320) may be performed as will be described below.

The above-mentioned Reed-Muller coding may be expressed by Expression 4 below and a basis sequence illustrated in FIG. 4 that will be described later.

$$q_i^{RI} = \sum_{n=0}^{N^{RI}-1} (O_n^{RI} \cdot M_{(i \bmod 32),n}) \bmod 2 \quad \text{[Expression 4]}$$

$$(i = 0, 1, \ldots, Q_{RI} - 1)$$

Here, $q_i^{RI}$ denotes a bit sequence obtained after encoding, $Q_{RI}$ denotes the number of bits after encoding. $M_{i,n}$ denotes a basis sequence having a value of 0 or 1.

FIG. 4 is a table showing an example of a basis sequence that can be applied to Reed-Muller coding of channel RI in the method of transmitting channel RI according to the second example embodiment of the present invention.

In the transmission method according to an example embodiment of the present invention, channel RI is Reed-Muller coded using a basis sequence having a 32-bit code length. Expression 4 above expresses Reed-Muller coding together with a process of generating a bit sequence to be transmitted by circular repetition.

In other words, $Q_{RI}$ denotes the number of bits to be transmitted through a wireless link and is determined according to the number of modulation symbols and a modulation order to be used to transmit a channel RI bit string through a PUSCH. When $N^{RI}$ channel rank bits are Reed-Muller coded into a bit sequence having a length of 32 bits, the coded bit sequences having a length of 32 bits are concatenated in a length of $Q_{RI}$ and rate-matched. For example, when $Q_{RI}$ is 100, a Reed-Muller coded 32-bit bit sequence is repeated three times, and last four (=100−32×3) bits may be the foremost four bits of the Reed-Muller coded bit sequence.

In other words, in a method of encoding channel RI according to an example embodiment of the present invention, linear combination is applied to three or more channel RI bits to perform encoding.

Finally, in the modulation symbol generating step (S330), the bit sequence that has been Reed-Muller coded and rate-matched is applied to a modulation mapper to generate modulation symbols, and the generated modulation symbols are mapped to resource locations designated in a PUSCH and transmitted.

Using a method of transmitting downlink channel RI through a PUSCH according to example embodiments of the present invention, the channel RI can be efficiently encoded and transmitted even if three or more channel RI bits are required to transmit the downlink channel RI.

In particular, a method of transmitting downlink channel RI according to example embodiments of the present invention can be employed when five or more antennas are required for downlink transmission or several carrier bands are used by carrier aggregation as specified in 3GPP LTE-advanced following 3GPP LTE release 10.

While the example embodiments of the present invention and their advantages have been described in detail, it should be understood that various changes, substitutions and alterations may be made herein without departing from the scope of the invention.

What is claimed is:

1. A *communication* method [of transmitting channel rank information (RI) when a number of bits for transmitting the channel RI to be transmitted through a physical uplink shared channel (PUSCH) is three or more], the method comprising:

mapping [the channel RI to be transmitted] *rank indication (RI)* to a [channel RI bit string of 3 bits or more] *set of bits, the set of bits comprising $N^{RI}$ bits $\{O_0^{RI}\ O_1^{RI} \ldots O^{RI}_{N^{RI}-1}\}$, wherein $N^{RI}$ is an integer equal to or larger than 3*;

[Reed-Muller coding] *encoding* the [channel RI bit string using a basis sequence having a 32-bit code length] *set of bits to generate a set of encoded bits*; [and]

generating [modulation] symbols [by applying the Reed-Muller coded bit sequence to a modulation mapper] *based on the set of encoded bits; and*

*transmitting the symbols*,

[wherein, when the channel RI to be transmitted is mapped to a 3-bit channel RI bit string, mapping the channel RI includes mapping the channel RI (one value of {1, 2, 3, 4, 5, 6, 7, 8}) to a bit 3-bit channel RI bit string $[O_0^{RI}O_1^{RI}O_2^{RI}]$ according to the table of FIG. 2, and]

wherein the [Reed-Muller coding] *encoding* is performed by the following expression:

$$q_i^{RI} = \sum_{n=0}^{N^{RI}-1} (O_n^{RI} \cdot M_{(i \bmod 32),n}) \bmod 2 \quad (i = 0, 1, \ldots, Q_{RI} - 1)$$

where $q_i^{RI}$ denotes a bit sequence obtained after encoding, $Q_{RI}$ denotes a number of bits after encoding, *and* $M_{i,n}$ [and] denotes a [basis] sequence [having a value of 0 or 1] *defined by Table 1:*

*TABLE 1*

| $i$ | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0. |

2. The method of claim 1, wherein [the basis sequence $M_{i,n}$ is defined by the table of FIG. 4] *the encoding is Reed-Muller coding.*

*3. The method of claim 1, wherein the symbols are transmitted through a physical uplink shared channel (PUSCH).*

*4. The method of claim 1, wherein the $N^{RI}$ is larger than 3.*

*5. A communication apparatus, comprising a processor:*

*wherein the processor is configured to:*

*map rank indication (RI) to a set of bits, the set of bits comprising $N^{RI}$ bits $\{O_0^{RI}\ O_1^{RI} \ldots O^{RI}_{N^{RI}-1}\}$, wherein $N^{RI}$ is an integer equal to or larger than 3;*

*encode the set of bits to generate a set of encoded bits;*

*generate symbols based on the set of encoded bits; and*

*cause the communication apparatus to transmit the symbols,*

*wherein the encoding is performed by the following expression:*

$$q_i^{RI} = \sum_{n=0}^{N^{RI}-1} (O_n^{RI} \cdot M_{(i \bmod 32),n}) \bmod 2 \quad (i = 0, 1, \ldots, Q_{RI} - 1)$$

*where $q_i^{RI}$ denotes a bit sequence obtained after encoding, $Q_{RI}$ denotes a number of bits after encoding, and $M_{i,n}$ denotes a sequence defined by Table 1:*

*TABLE 1*

| $i$ | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0. |

*6. The communication apparatus of claim 5, wherein the encoding is Reed-Muller coding.*

*7. The communication apparatus of claim 5, wherein the symbols are transmitted through a physical uplink shared channel (PUSCH).*

*8. The communication apparatus of claim 5, wherein the $N^{RI}$ is larger than 3.*

* * * * *